United States Patent
Akishev et al.

(10) Patent No.: US 7,814,658 B2
(45) Date of Patent: Oct. 19, 2010

(54) METHOD FOR PRODUCTION OF SANDWICH PANELS WITH ZIGZAG CORRUGATED CORE

(75) Inventors: Niaz Irekovich Akishev, Kazan (RU); Ildus Muhametgaleevich Zakirov, Kazan (RU); Alexandr Vladimirovich Nikitin, Kazan (RU)

(73) Assignees: Otkrytoe Aktsionernoe Obschestvo "Kazansky Nauchno-Isledovatelsky Institut Aviatsionnoi Tekhnologii", Kazan (RU); Airbus, Blagnac Cedex (FR)

( * ) Notice: Subject to any disclaimer, the term of this patent is extended or adjusted under 35 U.S.C. 154(b) by 986 days.

(21) Appl. No.: 10/579,764

(22) PCT Filed: Nov. 20, 2003

(86) PCT No.: PCT/RU03/00512

§ 371 (c)(1),
(2), (4) Date: Dec. 6, 2006

(87) PCT Pub. No.: WO2005/049247

PCT Pub. Date: Jun. 2, 2005

(65) Prior Publication Data

US 2007/0141376 A1    Jun. 21, 2007

(51) Int. Cl.
*B32B 3/00*    (2006.01)

(52) U.S. Cl. .............. 29/897.32; 29/897.3; 29/897.312; 29/557

(58) Field of Classification Search ............. 29/897.32, 29/244, 897, 897.3, 897.312, 557, 558; 156/470–473; 428/182, 304.4

See application file for complete search history.

(56) References Cited

U.S. PATENT DOCUMENTS

| 3,341,395 | A | * | 9/1967 | Weber ................ 428/134 |
| 5,069,008 | A | * | 12/1991 | Ellen ................. 52/80.2 |
| 5,635,306 | A | | 6/1997 | Minamida et al. |
| 2007/0098835 | A1 | | 5/2007 | Akishev et al. |
| 2007/0107485 | A1 | | 5/2007 | Akishev et al. |

FOREIGN PATENT DOCUMENTS

| AT | 389 070 | 10/1989 |
| JP | 64-004254 | 1/1989 |
| JP | 2001-232431 | 8/2001 |

* cited by examiner

*Primary Examiner*—David P Bryant
*Assistant Examiner*—Christopher Besler
(74) *Attorney, Agent, or Firm*—Oblon, Spivak, McClelland, Maier & Neustadt, L.L.P.

(57) ABSTRACT

A method for production of sandwich panels having a zigzag corrugated core made from sheet material to be used in aircraft construction, shipbuilding, and other branches of industry. The method improves the quality and ease of sheet blank folding into a 3-D relief structure. Folds are made in the sheet blank at locations of crimp zigzag lines protrusions and recesses. Holes are punched in the sheet with a diameter of the holes being greater than or equal to a sheet blank bending radius.

2 Claims, 2 Drawing Sheets

METHOD FOR PRODUCTION OF SANDWICH PANELS WITH ZIGZAG CORRUGATED CORE

TECHNICAL FIELD

Our invention can be defined in its most general form as a method for production of sandwich panels with zigzag corrugated core from sheet material used in aircraft construction, shipbuilding, and other branches of industry.

BACKGROUND ART

The method for production of sandwich panels with zigzag corrugated core including separate shaping of core layer and outer skins while core is produced by means of sheet blank bending along the zigzag lines of protrusions and recesses with the use of the marking-out, is taken as a prototype (Inventors' certificate no. 1,785,154 USSR, Int. Cl. B 23 K 20/00, Method for curvilinear sandwich panel with zigzag corrugated core production, Bulletin no. 28 of 30.07.93).

The short-coming of herein-presented method is in raise of material due to the stretching out effect in nodal zones. This effect occurs when shaping corrugated core in its nodal zones where at least four ridges of folded structure converge and a simultaneous bending in two planes takes place. It results in panel strength deterioration due to the point contact between the core and the skins since they interconnect only in nodal zones rather than along the lines of protrusions and recesses. In addition, the conditions of blank material deformation are least favorable due to necessity of applying considerable efforts when shaping; it results in concentration of stresses at this very zones and adversely affects the core-skin connection strength.

DISCLOSURE OF INVENTION

Our invention has for its object to improve the conditions of core shaping owing to elimination of bending zones in two planes and to increase the core-skin connection strength.

The technical result attained by our invention is the improvement of panels with folded structure core production quality.

The herein-presented technical result is attained by that in the known method for production of sandwich panel with zigzag corrugated core including separate shaping of the outer skins and the core and their further connection while the prescribed crimp profile is obtained by sheet blank bending along the marked-out on the development zigzag lines,— according to the technical solution: in the sheet blank of zigzag corrugated core development at the points of bending lines intersections the holes are punched with the diameter equal to $d_h \geq R_b$, where $R_b$ is the maximum sheet blank bending radius.

The undertaken by the applicant state of the art analysis shows that there are no analogs characterized by the combination of the features identical to those of the invention. Therefore, the claimed technical solution satisfies the "novelty" condition of patentability.

The results of retrieval for the known solutions in the given area with the aim to reveal the features identical with distinctions of the claimed technical solution show that its features do not result from the state of the art. From the defined state of the art the applicant managed to reveal no influence of the specified essential features upon the attainment of the stated technical result. The claimed technology, therefore, satisfies the "inventive step" condition of patentability.

BRIEF DESCRIPTION OF DRAWINGS

The FIGS. 1-4 present the essence of the invention.

BEST MODE FOR CARRYING OUT THE INVENTION

Figure 1:
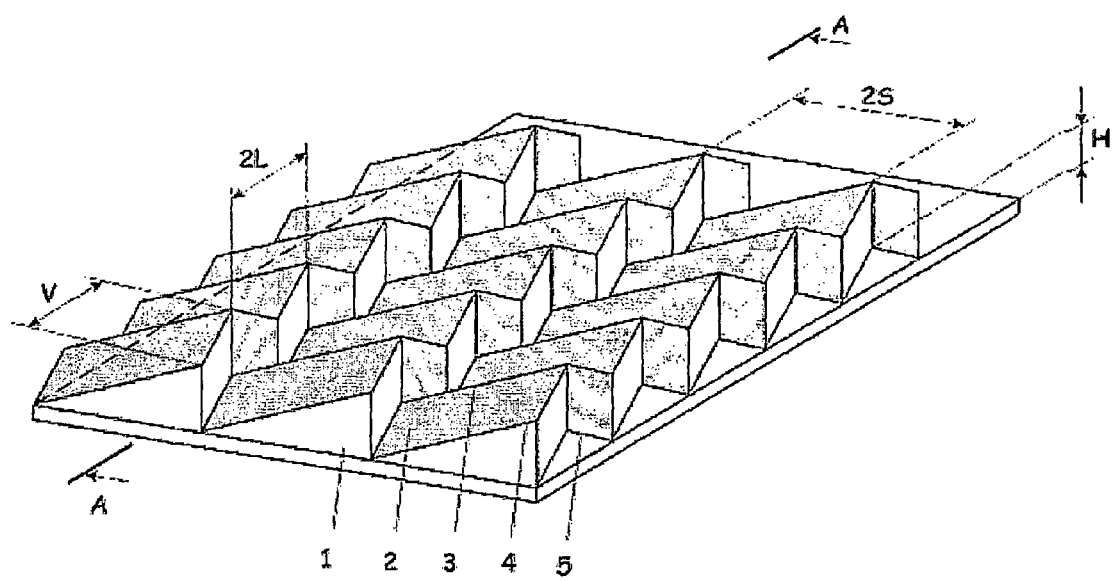
FIG. 1 is a general view of panel with zigzag core (the upper skin is not shown)
Figure 2:
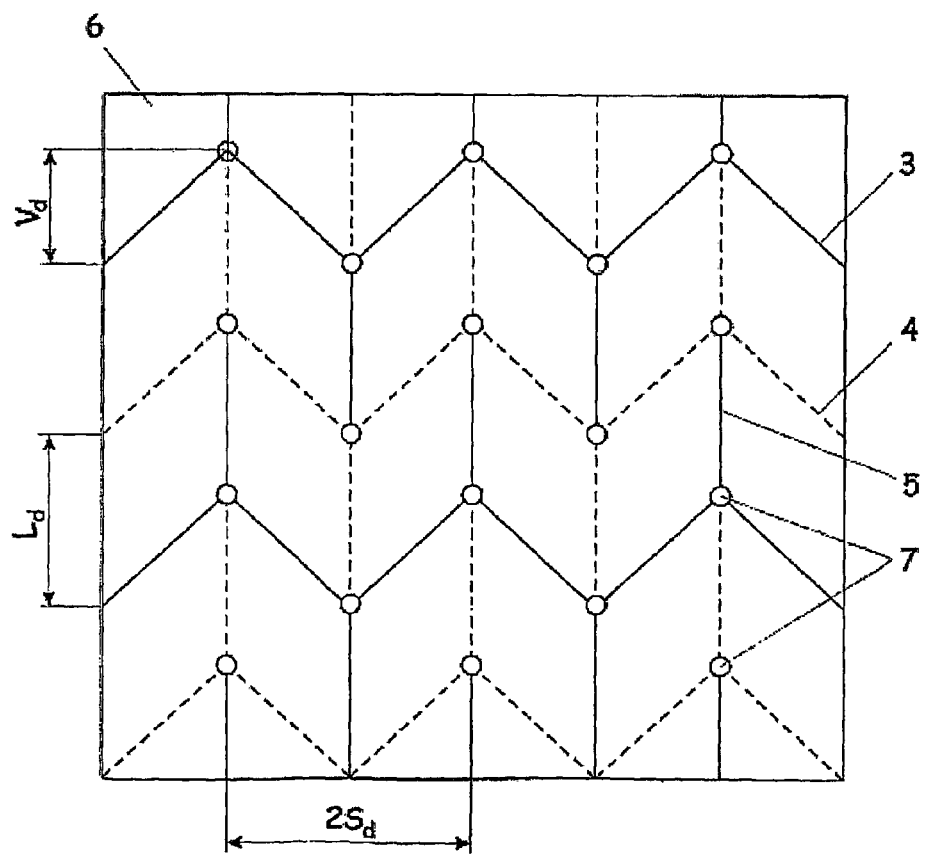
FIG. 2 shows a flat blank of core with the holes at the points of crimp zigzag line protrusions and recesses.
Figure 3:
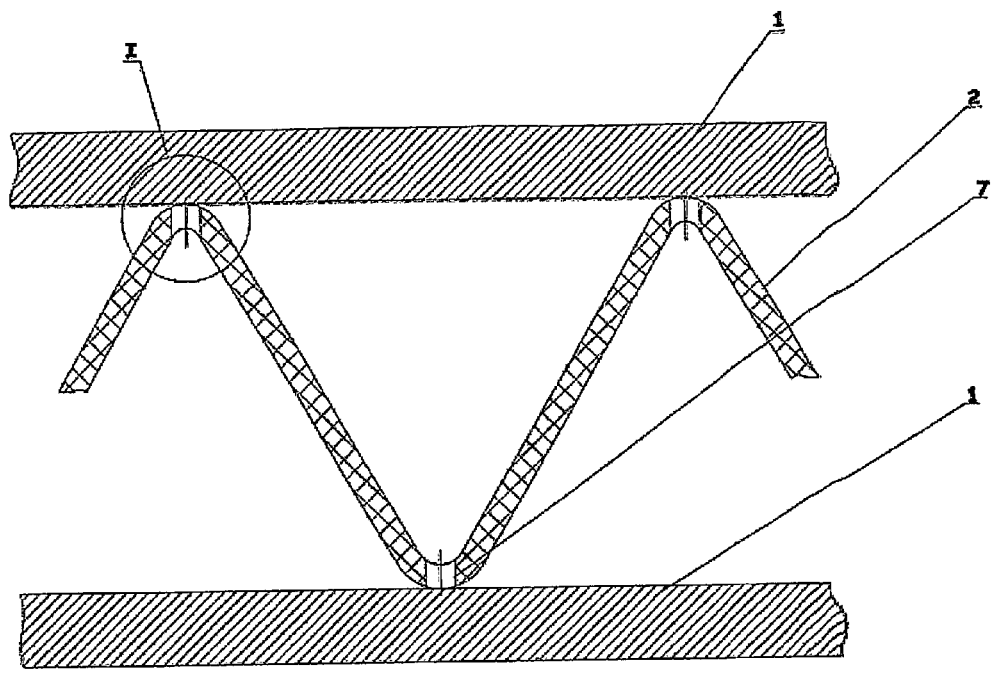
FIG. 3 is a sectional view A-A of FIG. 1.
Figure 4:
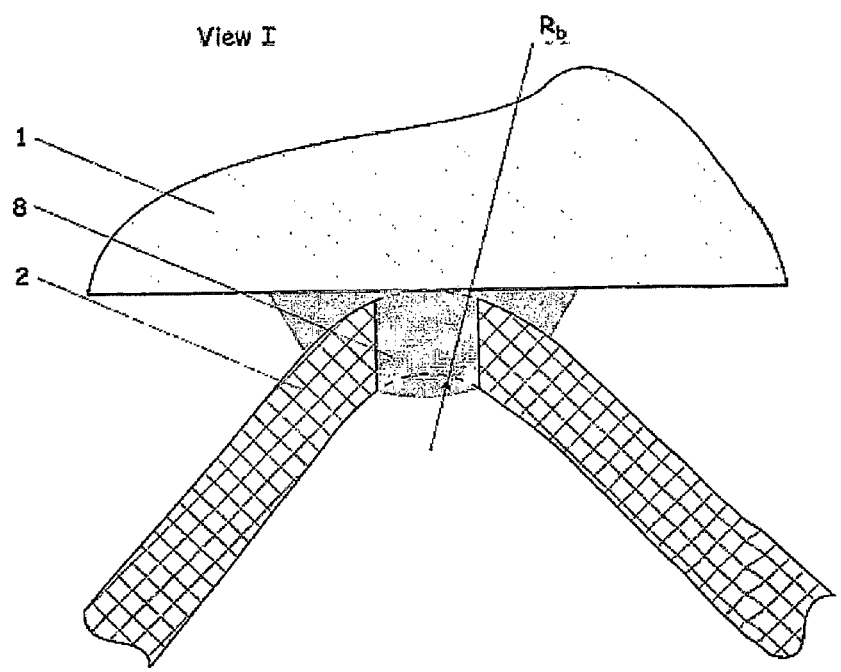
FIG.4 is a scaled up view I of FIG. 1 sectional view A-A.
The FIGS. 1-4 present the following positions:
1 is the lower and the upper (not shown) skins; 2 is the corrugated core; 3 are the zigzag lines of crimp protrusions; 4 are the zigzag lines of crimp recesses;
5 are the saw-tooth lines; 6 is the core sheet blank; 7 are the holes at locations of zigzag and saw-tooth lines; 8 is the composite material with adhesive properties.

Our method can be realized in the following way:
1) the outer and the inner skins 1 of the panel are produced;
2) the bending lines 3, 4, and 5 are marked-out on the core 2 sheet blank 6; the parameters and relative position of bending lines 3, 4, and 5 are related by core 2 design parameters:

$$L_d = f(H,L); \ V_d = f(V,L_d); \ S_d = f(V,S,H,L), \text{ where}$$

H is the height of zigzag crimp, V is the amplitude of zigzag lines, 2S is the step between zigzag lines, 2L is the step between saw-tooth lines, having the development dimensions: $2S_d$ is the step between zigzag lines, $L_d$ is the distance between zigzag lines, $V_d$ is the amplitude of zigzag lines;
3) the holes 7 are punched in the blank at the points of intersections of saw-tooth 5 and zigzag 3 and 4 lines; the diameter of the holes 7 is equal to $d_h \geq R_b$, where $R_b$ is the sheet blank bending radius at the points of intersections of saw-tooth 5 and zigzag 3 and 4 lines in the ready-made core 2;
4) the sheet blank 6 is shaped until the 3-D relief structure 2 is formed;
5) the obtained folded structure 2 is connected with the outer and inner skins 1, e.g. with the use of composite material 8 with adhesive properties.

INDUSTRIAL APPLICABILITY

The claimed method for production of sandwich panels with zigzag corrugated core can be used in industrial production of aircraft sandwich panels. Created on the basis of the claimed method equipment will allow to improve the zigzag corrugated core production quality and increase the sandwich panel strength.

The invention claimed is:
1. A method for production of sandwich panels with a zigzag corrugated core, the method comprising:
   separate shaping of outer panel skins and a zigzag corrugated core;
   obtaining a crimp profile of the core by sheet blank bending along development zigzag lines and saw-tooth lines marked out on the core, said zigzag lines and said saw-tooth lines intersecting each other;
   punching holes on the core at intersection points of said zigzag and said saw-tooth lines; and
   connecting the core with said outer panel skins,
   wherein a diameter of the holes is greater than or equal to a maximum sheet blank bending radius.

2. A method for production of aircraft sandwich panels with a zigzag corrugated core, the method comprising:
- separate shaping of outer panel skins and a zigzag corrugated core, shaping of the core including:
  - marking bending lines on a sheet blank, the bending lines including zigzag and saw-tooth lines;
  - obtaining a crimp profile of the core by bending said sheet blank along said zigzag lines and said saw-tooth lines, said zigzag lines and said saw-tooth lines intersecting each other;
  - punching holes on the core at intersection points of said zigzag lines and said saw-tooth lines, a diameter of the holes being greater than or equal to a maximum sheet blank bending radius; and
  - forming a 3-D structure having a height as a function of lengths of said zigzag lines; and
- connecting the core having said 3-D structure with said outer panel skins using an adhesive such that the core is placed between an upper outer panel skin and a lower outer panel skin to form a sandwich panel, the upper outer panel skin and the lower outer panel skin not in contact with each other.

* * * * *